(12) United States Patent
Tamir

(10) Patent No.: US 10,551,148 B1
(45) Date of Patent: Feb. 4, 2020

(54) JOINT FIREARM TRAINING SYSTEMS AND METHODS

(71) Applicant: Modular High-End LTD., Rishpon (IL)

(72) Inventor: Gal Tamir, Herzliya (IL)

(73) Assignee: Modular High-End LTD., Rishpon (IL)

( * ) Notice: Subject to any disclaimer, the term of this patent is extended or adjusted under 35 U.S.C. 154(b) by 0 days.

(21) Appl. No.: 16/211,322

(22) Filed: Dec. 6, 2018

(51) Int. Cl.
  F41G 3/26 (2006.01)
  F41J 11/00 (2009.01)
  F41J 5/10 (2006.01)
  G06K 9/00 (2006.01)

(52) U.S. Cl.
  CPC .................. F41G 3/26 (2013.01); F41J 5/10 (2013.01); F41J 11/00 (2013.01); G06K 9/00624 (2013.01)

(58) Field of Classification Search
  CPC .......................................................... F41G 3/26
  See application file for complete search history.

(56) References Cited

U.S. PATENT DOCUMENTS

| | | | |
|---|---|---|---|
| 5,215,464 A | 6/1993 | Marshall et al. | |
| 5,816,817 A * | 10/1998 | Tsang | F41G 3/2627 434/22 |
| 8,360,776 B2 | 1/2013 | Manard et al. | |
| 8,770,977 B2 | 7/2014 | Slayton et al. | |
| 8,894,412 B1 * | 11/2014 | Malin | F41A 33/02 434/11 |
| 9,022,785 B2 | 5/2015 | Dribben | |
| 9,052,161 B2 | 6/2015 | Page | |
| 9,200,870 B1 * | 12/2015 | Theel | F41J 11/00 |
| 10,077,969 B1 | 9/2018 | Tamir | |
| 2004/0087378 A1 * | 5/2004 | Liu | F41A 33/02 463/53 |
| 2008/0108021 A1 * | 5/2008 | Slayton | A63F 13/04 434/16 |
| 2009/0111073 A1 * | 4/2009 | Stanley | F41A 33/00 434/21 |
| 2010/0092925 A1 * | 4/2010 | Lvovskiy | F41A 33/02 434/22 |

(Continued)

FOREIGN PATENT DOCUMENTS

| | | |
|---|---|---|
| EP | 2884221 | 6/2015 |
| WO | 2018056001 | 3/2018 |

*Primary Examiner* — Samchuan C Yao
*Assistant Examiner* — Joshua S Luo
(74) *Attorney, Agent, or Firm* — Mark M. Friedman

(57) ABSTRACT

At least one shooter-side image sensor captures images of a plurality of shooters and a plurality of respective firearms periodically fired by the shooters. At least one target-side sensor collects data indicative of projectile strikes on a target area associated with at least one target. A processing unit analyzes images captured by the shooter-side image sensor and detects projectile discharges in response to firing of the firearms, and uniquely identifies each of the shooters associated with the detected projectile discharges. The processing unit detections of projectile strikes, based on the data collected by the target-side sensor, and the detected projectile discharges and identifies, for each detected projectile strike on the target area, the correspondingly fired firearm associated with the uniquely identified shooter.

17 Claims, 9 Drawing Sheets

(56) References Cited

U.S. PATENT DOCUMENTS

| | | | | |
|---|---|---|---|---|
| 2012/0274922 A1* | 11/2012 | Hodge | ............ | F41J 5/02 |
| | | | | 356/28 |
| 2014/0295380 A1* | 10/2014 | Amis | ............ | F41G 3/2627 |
| | | | | 434/21 |
| 2014/0349254 A1* | 11/2014 | Lohbihler | ............ | F41G 3/2655 |
| | | | | 434/22 |
| 2015/0023591 A1* | 1/2015 | Potluri | ............ | F41J 5/10 |
| | | | | 382/162 |
| 2015/0285593 A1 | 10/2015 | Dribben | | |
| 2015/0286275 A1* | 10/2015 | Huang | ............ | G06F 3/011 |
| | | | | 345/156 |
| 2016/0091282 A1* | 3/2016 | Baker | ............ | F41G 3/02 |
| | | | | 348/158 |
| 2016/0209173 A1* | 7/2016 | Dribben | ............ | F41J 5/06 |
| 2016/0298930 A1* | 10/2016 | Squire | ............ | F41G 3/2694 |
| 2017/0097209 A1 | 4/2017 | Portoghese et al. | | |
| 2018/0031353 A1* | 2/2018 | Skrepetos | ............ | F41J 5/10 |
| 2019/0003804 A1* | 1/2019 | Deng | ............ | F41A 35/00 |

\* cited by examiner

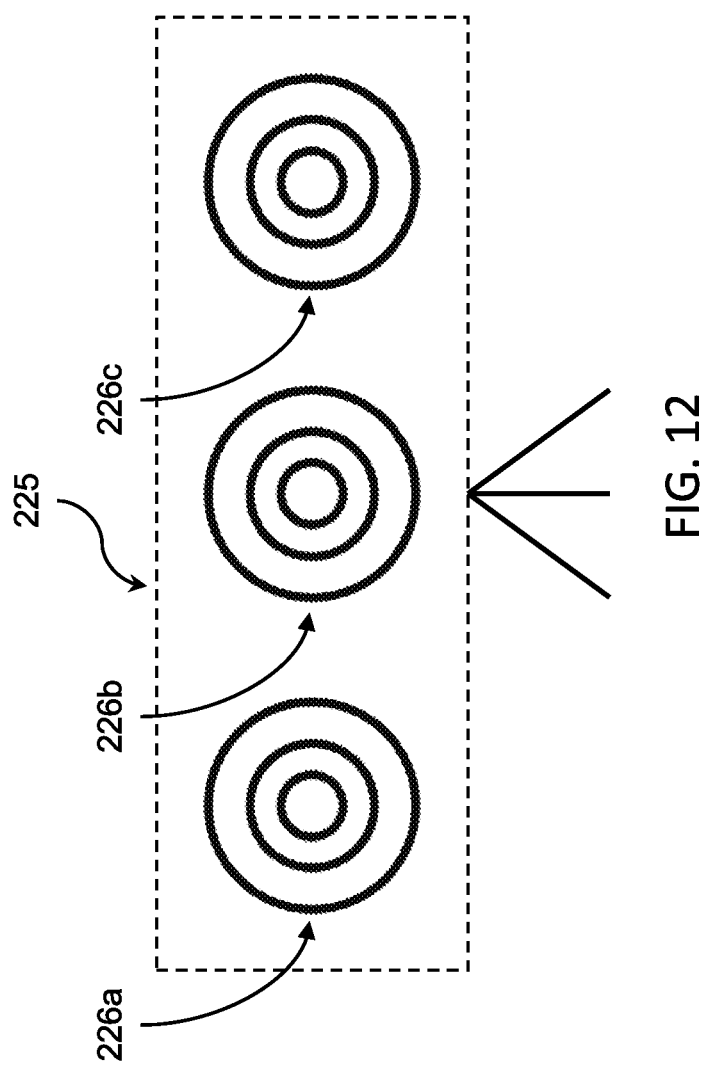

JOINT FIREARM TRAINING SYSTEMS AND METHODS

TECHNICAL FIELD

The present invention relates to firearm training.

BACKGROUND OF THE INVENTION

In firearm training facilities, such as shooting ranges, in which multiple shooters fire simultaneously on respective dedicated targets or a single shared target, tracking of individual shooter performance is paramount. Shooting ranges which utilize non-live fire ammunition, for example, laser-based firearm training, may provide comprehensive individualized shooter performance data, as the firearm munition discharges may be laser pulses which can be easily correlated by a computer system with detection of corresponding laser pulse strikes on the target. However, conventional shooting ranges that utilize live fire ammunition cannot provide simple means for linking individual shooters with their individual performance. More complicated means exist by providing the shooters with body mounted detection mechanisms, however, such means can be cumbersome for the shooter.

Combat training simulations, such as those employed by, for example, military, law enforcement and security organizations, may provide means for comprehensive performance data. Combat training simulations are typically divided into the main categories of live simulations, constructive simulation, and virtual simulations. In live simulations, real people operate real systems in non-operational modes, for example, the operation of real firearms using laser pulses instead of live fire ammunition. In constructive simulations, simulated people operate simulated systems, for example military style war games, in which real people may make inputs to the simulation, in other words—command, control and decision-making processes, but cannot directly take actions to effect immediate outcomes. In virtual simulations, real people operate computer-based simulated systems, for example, virtual shooting simulators. Live simulations and virtual simulations can provide means for comprehensive individualized shooter performance data, as live simulations utilize laser-based ammunition, as discussed above, and virtual simulations are strictly computer-based which allow computer systems to track individual performance.

However, live fire combat training, which utilizes live fire ammunition, which is typically regarded as the most effective and realistic form of combat training, does not provide the basic features of virtual and live simulations, such as individual shooter performance tracking, and therefore training involving live fire is usually an undocumented experience that does not support methodological learning and efficiency processes over time. Furthermore, live fire combat training does not provide any means for collaborative training between multiple shooters deployed in different geographic locations.

SUMMARY OF THE INVENTION

The present invention is directed to systems and methods for joint firearm training of shooters.

According to the teachings of an embodiment of the present invention, there is provided a system for jointly training a plurality of shooters. The system comprises: a shooter-side sensor arrangement including at least one shooter-side image sensor deployed to capture images of the shooters and a plurality of respective firearms periodically fired by the shooters; a target-side sensor arrangement including at least one target-side sensor deployed to collect data indicative of projectile strikes on a target area associated with at least one target; and a processing unit including at least one processor operatively coupled to the sensor arrangements. The processing unit is configured for: analyzing one or more of the images captured by the at least one shooter-side image sensor to detect projectile discharges in response to firing of the firearms, and to uniquely identify each of the shooters associated with the detected projectile discharges, and correlating detections of projectile strikes, based on the data collected by the at least one target-side sensor, and the detected projectile discharges to identify, for each detected projectile strike on the target area, the correspondingly fired firearm associated with the uniquely identified shooter.

Optionally, the at least one target-side sensor is an image sensor, and the processing unit is further configured for analyzing image data captured by the target-side image sensor to detect projectile strikes on the target area corresponding to firing of the firearms.

Optionally, the analyzing one or more of the images captured by the at least one shooter-side image sensor to uniquely identify each of the shooters associated with the detected projectile discharges is performed by evaluating one or more visual parameters associated with each of the shooters.

Optionally, the at least one shooter-side image sensor has an associated field of view, and the field of view is divided into sub-regions, and each shooter is positioned in a different sub-region.

Optionally, the detected projectile discharges and the detected projectile strikes include temporal information.

Optionally, the correlating includes analyzing the temporal information of the detected projectile discharges and the detected projectile strikes to form estimated of times of flight for pairs of detected projectile discharges and detected projectile strikes.

Optionally, the system further comprises: an image projecting unit operative to project a virtual scenario onto a background, and the target area is included in the projected virtual scenario.

Optionally, each of the shooters has a corresponding virtual entity, projected onto the background by the image projecting unit.

Optionally, the processing unit is linked to a server via a network.

Optionally, the at least one target includes a plurality of targets, and each respective firearm is fired at a respective one of the plurality of targets.

Optionally, the plurality of shooters includes more than two shooters, a first subset of shooters periodically fires a first subset of the respective firearms to strike a first target, and a second subset of shooters periodically fires a second subset of the respective firearms to strike a second target, and the first and second targets are deployed in different geographic locations.

Optionally, the at least one shooter-side sensor arrangement includes a plurality of shooter-side sensor arrangements, and the at least one target-side sensor arrangement includes a plurality of target-side sensor arrangement, and the at least one processing unit includes a plurality of processing units, and each of the processing units is linked to a server via a wired or wireless network.

Optionally, a first one of the shooter-side sensor arrangements, a first one of the target-side sensor arrangements, and a first one of the processing units are deployed together in a first geographic location, and a second one of the shooter-side sensor arrangements, a second one of the target-side sensor arrangements, and a second one of the processing units are deployed together in a second geographic location different from the first geographic location.

There is also provided according to an embodiment of the teachings of the present invention a method for jointly training a plurality of shooters. The method comprises: detecting, based on one or more captured images of the shooters and the respectively fired firearms, projectile discharges in response to firing of a plurality of respective firearms periodically fired by the shooters; uniquely identifying, based on the one or more captured images of the shooters and the respectively fired firearms, each of the shooters associated with the detected projectile discharges; detecting projectile strikes on a target area associated with at least one target corresponding to firing of the firearms; and correlating the detected projectile discharges and the detected projectile strikes to identify, for each detected projectile strike on the target area, the correspondingly fired firearm associated with the uniquely identified shooter.

Optionally, the detected projectile discharges and the detected projectile strikes include temporal information, and the correlating includes analyzing the temporal information of the detected projectile discharges and the detected projectile strikes to form estimated of times of flight for pairs of detected projectile discharges and detected projectile strikes.

There is also provided according to an embodiment of the teachings of the present invention a system for jointly training a plurality of shooters periodically firing a plurality of respective firearms. The system comprises: at least one shooter-side sensor arrangement including at least one shooter-side image sensor deployed to capture images of the shooters; at least one target-side sensor arrangement including at least one target-side sensor deployed to collect data indicative of projectile strikes on a virtual target; at least one image projecting unit for displaying a virtual environment on a background, the virtual environment including the virtual target; and at least one processing unit including at least one processor operatively coupled to the image projecting unit and the sensor arrangements. The processing unit is configured for: analyzing one or more of the images captured by the at least one shooter-side image sensor to detect projectile discharges in response to firing of the firearms by the shooters, and translating detections of projectile strikes on the virtual target, based on the data collected by the at least one target-side sensor, and the detected projectile discharges into virtual actions in the virtual environment. Optionally, the at least one image projecting unit includes a plurality of image projecting unit, and the at least one shooter-side sensor arrangement includes a plurality of shooter-side sensor arrangements, and the at least one target-side sensor arrangement includes a plurality of target-side sensor arrangement, and the at least one processing unit includes a plurality of processing units, and each of the processing units is linked to a server via a wired or wireless network.

Optionally, a first one of the image projecting units, a first one of the shooter-side sensor arrangements, a first one of the target-side sensor arrangements, and a first one of the processing units are deployed together in a first geographic location, and a second one of the image projecting units, a second one of the shooter-side sensor arrangements, a second one of the target-side sensor arrangements, and a second one of the processing units are deployed together in a second geographic location different from the first geographic location.

Optionally, the virtual environment further includes a plurality of virtual entities, each respective virtual entity representing a respective shooter, and the virtual actions include virtual firing actions performed by the virtual entity and virtual strikes on the virtual target.

There is also provided according to an embodiment of the teachings of the present invention a system for jointly training a plurality of shooters periodically firing a plurality of respective firearms. The system comprises: a plurality of shooter-side image sensors including at least a first and a second shooter-side image sensor, the first shooter-side image sensor being deployed to capture images of a first subset of the shooters, and the second shooter-side image sensor deployed to capture images of a second subset of the shooters, the first and second shooter-side image sensors being located in different geographic locations; a plurality of target-side sensors including at least a first and a second target-side sensor, the first target-side sensor deployed to collect data indicative of projectile strikes on at least one target projected as part of a shared virtual environment on a first background, the second target-side sensor deployed to collect data indicative of projectile strikes on the target projected as part of the shared virtual environment on a second background, the first and second target-side sensors collocated with the first and second shooter-side image sensors, respectively; a plurality of image projecting units including at least a first and a second image projecting unit, the first image projecting unit displaying the shared virtual environment on the first background, and the second image projecting unit displaying the shared virtual environment on the second background, and the shared virtual environment including a plurality of virtual entities, each virtual entity representing a respective shooter based on one or more images captured by the shooter-side image sensors; a plurality of processing units including at least a first and a second processing unit, each of the processing units including at least one processor coupled to a storage medium; and a server linked to the processing units over a wired or wireless network. The first processing unit is configured for analyzing one or more of the images captured by the first shooter-side image sensor to detect projectiles discharges in response to firing of the firearms by the first subset of shooter. The second processing unit is configured for analyzing one or more of the images captured by the second shooter-side image sensor to detect projectiles discharges in response to firing of the firearms by the second subset of shooter. The server is configured for co-processing detections of projectile strikes on the target, based on the data collected by the first and second target-side sensors and the detected projectile strikes to translate the projectile discharges and the projectile strikes into shared virtual actions in the shared virtual environment.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 12 is a schematic front view illustrating a target area that includes multiple targets, according to embodiments of the present disclosure.

DESCRIPTION OF THE PREFERRED EMBODIMENTS

Figure 1:
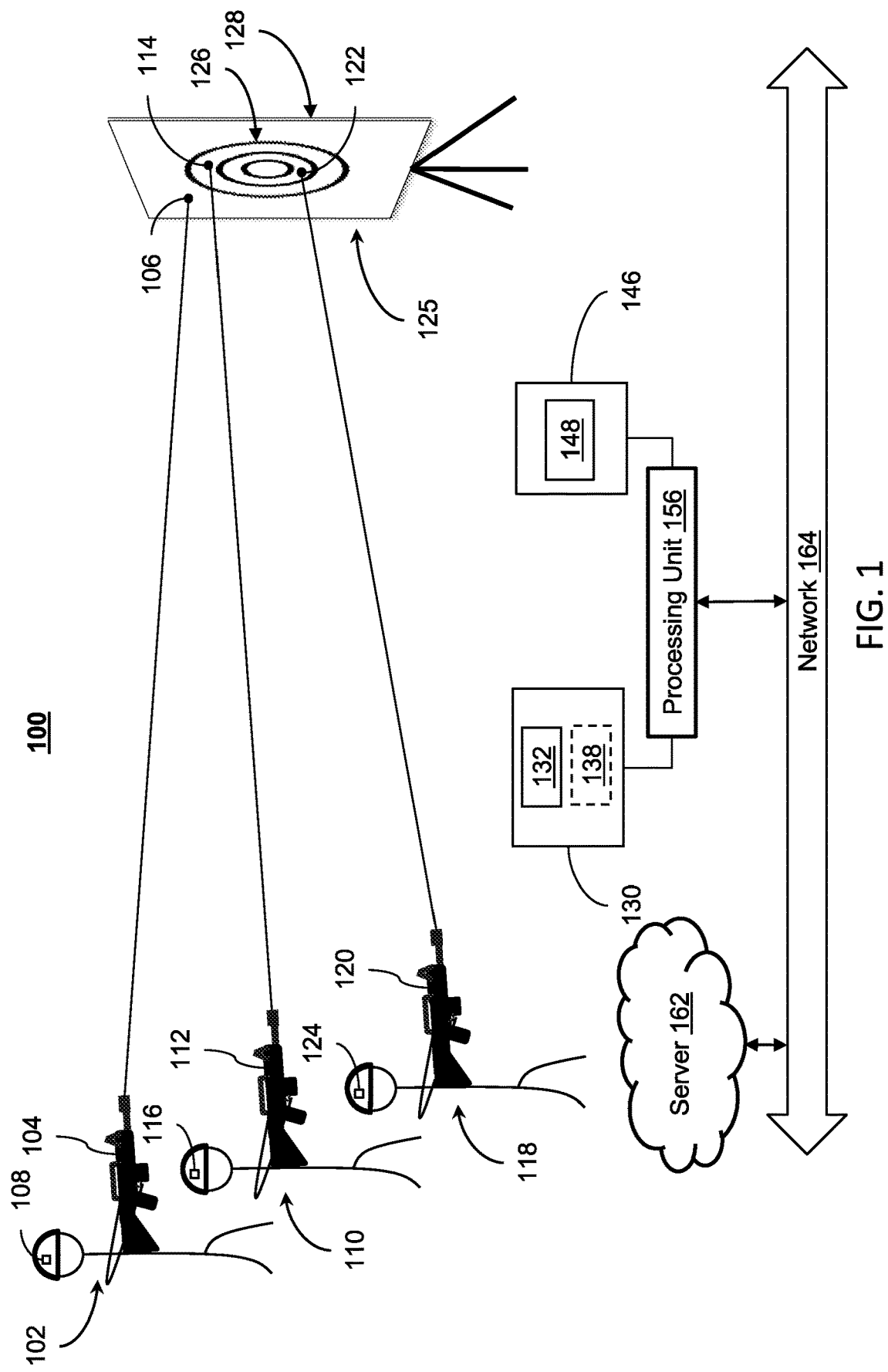
FIG. 1 is a schematic illustration of a system, operative, according to embodiments of the present disclosure, for joint firearm training of shooters, the system including a shooter-side sensor arrangement, a target-side sensor arrangement, and a processing unit.

The present invention is directed to systems and methods for joint firearm training of shooters using live fire projectiles.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Embodiments of the present disclosure may be used to advantage in organized weapons training facilities operated by, for example, military, law enforcement and/or security organizations, in which large numbers of trainees (i.e., shooters) undergo firearm weapons training in joint training exercises. In such training facilities, multiple shooters may fire weapons at a single shared target, or an array of targets may be deployed with each shooter fire a weapon at a respective designated target. Embodiments of the present disclosure may also be used to advantage to allow collaborative training between multiple shooters located in different geographical locations. For example, a first subset of shooters may be deployed in a first geographical location and fire respective weapons at a first set of one or more targets, and a second subset of shooters may be deployed in a second geographical locations and fire respective weapons at a second set of one or more targets.

Referring now to the drawings, FIG. 1 illustrates a system, generally designated 100, for collaborative, i.e., joint firearm training of shooter, according to an embodiment of the present disclosure. The system 100 is deployable in various locations, but is preferably deployed at a firearm training location, such as a shooting range.

A plurality of shooters each aim a designated firearm (i.e., weapon) at a target 126 and operate the designated firearm by firing the firearm to discharge a ballistic projectile (i.e., a live fire projectile, e.g., bullet or round) with a goal of striking the target 126 with the discharged ballistic projectile. In the non-limiting example deployment of the system 100 illustrated in FIG. 1, three such shooters are depicted, namely a first shooter 102, a second shooter 110, and a third shooter 118. The first shooter 102 operates a first firearm 104 to discharge a first projectile 106. The second shooter 110 operates a second firearm 112 to discharge a second projectile 114. The third shooter 118 operates a third firearm 120 to discharge a third projectile 122.

The target 126 is mounted to a background 128, which may be implemented as a rack, stand or holder for holding the target 126. As the target 126 may be in principle smaller than the background 128 onto which it is mounted, the overall area which encompasses the target 126 and the background 128 is referred to herein as a target area 125.

The shooters 102, 110, 118 are positioned opposite (i.e., across from) the target 126 in spaced relation to each other, in a manner such that the shooters 102, 110, 118 do not interfere with each other when firing on the target 126 simultaneously. In certain operating conditions, the shooters 102, 110, 118 are positioned, for example in a line, such that they are approximately the same distance from the target 126.

Note that although FIG. 1 shows multiple shooters aiming respective firearms at a single common target (i.e., the target 126), the joint firearm training methodologies of the present disclosure are also applicable to situations in which the target area 125 covers a plurality of targets (arranged, for example, in an array) and each individual shooter aims his respective firearm at a respective dedicated target. For example, FIG. 12 shows a front view of a target area 225 that covers three targets, namely a first target 226a, a second target 226, and a third target 226c, deployed in an array. The boundary of the target area 225 is demarcated by dashed lines for clarity. In the example of FIG. 12, the first shooter 102 may operate the first firearm 104 to strike the first target 226a in the target array, the second shooter 110 may operate the second firearm 112 to strike the second target 226b in the target array, and the third shooter 118 may operate the third firearm 120 to strike the third target 226c in the target array.

A first sensor arrangement 130, referred to hereinafter as a shooter-side sensor arrangement 130, is deployed in front of the shooters 102, 110, 118 so as to cover a coverage area in which the shooters 102, 110, 118 are positioned. The shooter-side sensor arrangement 130 includes at least one image sensor, namely a first shooter-side image sensor 132. The image sensor 132 may be implemented as part of a camera system, and within the context of the present disclosure the term image sensor and camera are used interchangeably. The image sensor 132 has an associated field-of-view (FOV) that covers the coverage area. The shooter-side sensor arrangement 130 is deployed such that the shooters 102, 110, 118 and the correspondingly operated firearms 104, 112, 120 are within the FOV of the image sensor 132 so as to enable image capture of the shooters 102, 110, 118 and the correspondingly operated firearms 104, 112, 120 by the shooter-side image sensor 132.

In certain embodiments, more than one shooter-side image sensor may be deployed, as shown, for example, in the non-limiting example deployment of the system 100 illustrated in FIG. 1 which shows a second shooter-side image sensor 138. Two shooter-side image sensors may be used in order to estimate the distance between the shooter-side sensor arrangement 130 and the shooters 102, 110, 118, as will be discussed in subsequent sections of the present disclosure.

In addition, deployment of more than one shooter-side image sensor may be used for redundant image capture of the shooters, in which two (or more) shooter-side image sensors capture images of the same subset of shooters. For example, the first shooter-side image sensor 132 may be deployed to capture images of the shooters 102 and 110, and the second shooter-side image sensor 138 may be deployed to capture images of the shooters 110 and 118, resulting in both shooter-side image sensors 132 and 138 capturing images of the second shooter 110. Alternatively, for example, the shooter-side image sensors 132 and 138 may both be deployed to capture images of all three shooters 102, 110, 118.

The use of more than one shooter-side image sensor may also be used to advantage in situations in which the FOV of one shooter-side image sensor is not wide enough to effectively capture images of all of the shooters and corresponding firearms. In such situations, the shooter-side image sensors may be deployed such that the corresponding FOVs allow image capture of different subsets of the shooters and corresponding firearms. For example, the first shooter-side image sensor 132 may be deployed with a FOV allowing image capture of the shooters 102 and 110 and their corresponding firearms 104 and 112, while the second shooter-side image sensor 138 may be deployed with a FOV to allow image capture of the third shooter 118 and the third firearm 120. As such, as the number of shooters firing on the same target grows, additional shooter-side image sensors can be deployed to ensure image capture of all of the shooters. As should be understood, the subsets of shooters may be non-overlapping, or may be overlapping to allow for measuring the position of each of the shooters and the distance of each shooter from the shooter-side sensor arrangement 130 or for redundant image capture, as described above.

The shooter-side image sensor 132 (or sensors 132 and 138) are preferably implemented as infrared (IR) detection capable image sensors that operate at an image capture rate (i.e., frame rate) that is high enough, for example 90 frames per second (fps) or more, to support detection of projectile discharges (i.e., exit blasts from fired shots) from the firearms 104, 112, 120 in response to the shooters firing the respective firearms. One example of such an image sensor is the ICX424AL CCD sensor from Sony, available as part of the acA640-90gc camera system from Basler.

The number of shooters for which a single shooter-side image sensor can successfully capture images thereof, with high enough resolution to support detection of projectile discharges, is a function of the optical parameters of the shooter-side image sensor. The shooter-side image sensor 132, when implemented, for example, as the above-mentioned IR detection capable image sensor, can support image capture of anywhere between 1 and 10 shooters when positioned at an average distance in the range of 6-8.5 meters from each shooter. The distance (i.e., range) between the shooter-side sensor arrangement 130 and the shooter 102, 110, 118 and the sensor arrangement 130 width of the FOV may be a function of the optical parameters of the shooter-side image sensor 132 and the number of non-overlapping image sensors such as the second image sensor 138.

A second sensor arrangement 146, referred to hereinafter as a target-side sensor arrangement 146, is deployed in front of the target area 125 to cover a coverage area in which the target area 125 is positioned. The target-side sensor arrangement 146 includes at least one target-side projectile strikes detection sensor 148 deployed to collect data indicative of projectile strikes on the target area 125 in order to allow detection of projectile strikes on the target area 125. In a non-limiting exemplary implementation, the projectile strikes detection sensor 148 is implemented as an image sensor. Periodically throughout remaining sections of the present disclosure, the projectile strikes detection sensor 148 will be described within the context of the aforesaid non-limiting exemplary image sensor implementation, specifically when discussing sensor parameters that are applicable to image sensor specific implementations, such as, for example, optical parameters and field-of-view (FOV). It is noted, however, that the projectile strikes detection sensor 148 may be implemented as any other type of sensor capable of detecting projectile strikes on the target area 125, including, but not limited to, pressure sensors and acoustic based sensors, such as, for example Location of Miss and Hit (LOMAH) type sensors. In non-image sensor-based implementations of the target-side sensor 148, the target-side sensor 148 is configured to detect projectile strikes on the target area 125 based on the data collected by the target-side sensor 148.

The target-side projectile strikes detection sensor 148, when implemented as an image sensor, has an associated FOV that covers the coverage area. The target-side sensor arrangement 146 is deployed such that the target area 125 is within the FOV of the target-side image sensor 146. The target-side projectile strikes detection sensor 148 is preferably implemented as part of a camera system that operates at a high enough frame rate and resolution to support detection of projectile strikes on the target area 125. The target-side projectile strikes detection sensor 148 may be implemented using an image sensor of the same type as the shooter-side image sensor 132. However, the target-side image sensor may operate at a lower frame rate than that of the shooter-side image sensor 132, for example 25 fps, and still support detection of projectile strikes on the target area 125 (as long as the resolution and optical parameters of the target-side image sensor enable detection of projectile strikes on the target area 125).

In a non-limiting example deployment, the target-side sensor arrangement 146 is deployed such that the distance between the target area 125 and the target-side projectile strikes detection sensor 148 is in the range of 0.8-1.5 meters. The range between the target-side sensor arrangement 146 and the target area 125 may be a function of the width of the FOV of the target-side projectile strikes detection sensor 148.

In embodiments in which each shooter aims his respective firearm at a respective dedicated target, a single target-side sensor 148 may be deployed to collect data indicative of projectile strikes on each of the targets. Alternatively, the target-side sensor arrangement 146 may include a plurality of target-side projectile strikes detection sensors 148, with each target-side projectile strikes detection sensor 148 deployed to collect data indicative of projectile strikes on a respective one of the plurality of targets.

In operation, the shooter-side image sensor 132 (or sensors 132 and 138) captures a series of images of the shooters 102, 110, 118 and the respectively operated firearms 104, 112, 120, and the target-side projectile strikes detection sensor 148 captures a series of images of the target area 125. The target-side projectile strikes detection sensor 148 and the shooter-side image sensor 132 are synchronized by a processing unit 156.

It is noted that the terms "series of images" and "sequence of images" may be used interchangeably throughout this document, and that these terms carry with them an inherent temporal significance such that temporal order is preserved. In other words, a first image in the series or sequence of images that appears prior to a second image in the series or sequence of images, implies that the first image was captured at a temporal instance prior to the second image.

Figure 2:
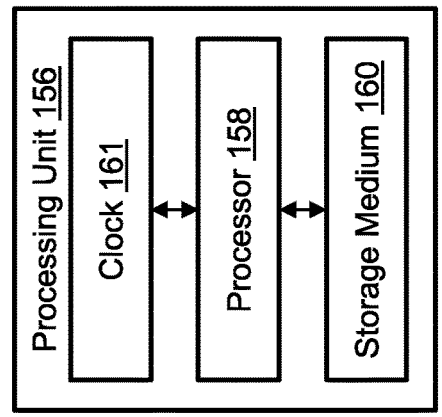
FIG. 2 is a block diagram of the processing unit of the system, according to embodiments of the present disclosure.

With continued reference to FIG. 1, refer now to FIG. 2, a block diagram of the processing unit 156. The processing unit 156 includes a processor 158 coupled to an internal or external storage medium 160 such as a memory or the like, and a clock 161. The external storage medium 160 may be implemented as an external memory device connected to the processing unit 156 via a data cable or other physical interface connection, or may be implemented as a network storage device or module, for example, hosted by a remote server (e.g., a cloud server). The clock 161 includes timing circuitry for synchronizing the sensor arrangements 130 and 146. The processing unit 156 is configured to apply image processing and computer vision algorithms to identify changes in a scene based on images of the scene captured over an interval of time. In certain embodiments of the present disclosure, the processing unit 156 applies such algorithms to images of two separate scenes, namely a first scene in which the target area 125 is located, and a second scene in which the shooters 102, 110, 118 are located.

The processor 158 and the storage medium 160, although shown as a single component for representative purposes, may be multiple components (i.e., multiple processors and/or multiple storage mediums). The processor 158 can be implemented as any number of computer processors, including, but not limited to, a microprocessor, microcontroller, an ASIC, a DSP, and a state machine. In certain non-limiting implementations, the processor 158 is advantageously implemented as an image processor. All of such processors include, or may be in communication with non-transitory computer readable media, such as, for example, the storage medium 160. Such non-transitory computer readable media store program code or instructions sets that, when executed by the processor 158, cause the processor 158 to perform actions. Types of non-transitory computer readable media include, but are not limited to, electronic, optical, magnetic, or other storage or transmission devices capable of providing a processor, such as the processor 158, with computer readable instructions.

In certain embodiments, the processing unit 156 is configured to receive, from the shooter-side sensor arrangement 130, the series of images captured by the shooter-side image sensor 132. The processing unit 156 analyzes the received series of images captured by the shooter-side image sensor 132 to detect projectile discharge events (referred to interchangeably as "projectile discharges") from each of the firearms of the shooters in the respective FOV of the shooter-side image sensor 132. Each detected projectile discharge is made in response to a shooter firing his respective firearm. For example, in a non-limiting implementation in which the first shooter-side image sensor 132 is deployed to capture images of all three of the shooters 102, 110, 118, the processing unit 156 is configured to detect the discharging of the projectiles 106, 114, 122, in response to the shooters 102, 110, 118 firing the respective firearms 104, 112, 120, thereby yielding three projectile discharge events.

The processing unit 156 may analyze the received shooter-side images in various ways. In a non-limiting implementation, the images captured by the shooter-side image sensor 132 are IR images. In a preferred but non-limiting exemplary implementation, the processing unit 156 implements machine/computer vision techniques to identify flashes, corresponding to projectile discharges, from the barrel of the firearm. In another non-limiting exemplary implementation, the processing unit 156 may detect projectile discharges via thermographic techniques, for example by detecting the heat signature of the projectile as it leaves the barrel of the firearm.

In another non-limiting implementation, which may be alternative to or in combination with the machine/computer vision techniques or thermographic implementation, individual images in the series of images are compared with one or more other images in the series of images to identify changes between images, in order to identify the flashes coming from the barrel of the firearm corresponding to projectile discharges.

The processing unit 156 may further link an identified projectile discharge with the firearm that discharged the projectile by identifying each of the firearms and/or shooters via various identification methods, as will be described in subsequent sections of the present disclosure.

The linking may be performed by determining which of the identified firearms and/or shooters is closest in proximity to which of the identified projectile discharges. The proximity may be evaluated on a per pixel level, for example by determining the differences in pixel location (in the series of images) between image pixels indicative of a projectile discharge and image pixels indicative of an identified firearm and/or shooter.

In certain embodiments, for example non-imaging implementations of the target-side projectile strikes detection sensor 148, the processing unit 156 is further configured to receive, from the target-side sensor arrangement 146, projectile strike events detected by the target-side projectile strikes detection sensor 148. The processing unit 156 analyzes the received projectile strike events (referred to hereinafter as "projectile strikes") on the target area 125. Each detected projectile strike is made in response to a projectile striking the target area 125. The detected projectile strikes correspond to the projectiles discharged by the firearms in response to shooters firing their respective firearms. In embodiments in which the target-side projectile strike detection sensor 148 is implemented as an image sensor, the processing unit 156 is configured to analyze a series of images of the target area 125 captured by the target-side projectile strikes detection sensor 148.

The processing unit 156 may analyze the received target-side projectile strike events in various ways. In a non-limiting implementation, individual images in the series of images are compared with one or more other images in the series of images to identify changes between images, in order to identify projectile strikes on the target area 125.

The projectile strike identification also includes identification of location on the target area 125 at which the projectile strike occurred, and as such may also provide a projectile strike accuracy score or metric. For example, the processing unit 156 may identify which portion of the target 126 a specific projectile struck in order to classify the projectile strikes as hits or misses. For example, as illustrated in FIG. 1, the first shooter 102 fires the first firearm 104 such that the projectile 106 strikes the target area 125 but misses the target 126. The second shooter 110 fires the second firearm 112 such that the projectile 114 strikes the outer ring of the target 126. The third shooter 118 fires the third firearm 120 such that the projectile 122 strikes the middle ring of the target 126. Accordingly, the processing unit 156 may assign the third shooter 118 with the highest accuracy metric or score, and the may assign the first shooter 102 with the lowest accuracy metric or score. As should be apparent, the processing unit 156 may aggregate or accumulate the projectile strikes to provide an overall accuracy metric or score per shooter.

The image comparison methods, mentioned above within the context of detecting projectile strikes, may include pairwise comparisons of images to determine whether such images are identical. If such image pairs are deemed to be identical, no detection of projectile strikes is made. If such image pairs are deemed to be non-identical, a detection of a projectile strike is made. The term "identical" refers to images which are determined to be closely matched by the processing unit 156, such that a change in the scene is not detected by the processing unit 156. The term "identical" is not intended to limit the functionality of the processing unit 156 to detecting changes to the scene only if the corresponding pixels between two images have the same value.

With respect to the above described processes for detecting projectile discharges and projectile strikes on the target area 125, the processing unit 156 is preferably configured to execute one or more image comparison algorithms, which utilize one or more computer vision and/or image processing techniques. In one example, the processing unit 156 may be configured to execute keypoint matching computer vision algorithms, which rely on picking points, referred to as "key points", in the image which contain more information than other points in the image. An example of keypoint matching is the scale-invariant feature transform (SIFT), which can detect and describe local features in images, described in U.S. Pat. No. 6,711,293.

In another example, the processing unit 156 may be configured to execute histogram image processing algorithms, which bin the colors and textures of each captured image into histograms and compare the histograms to determine a level of matching between compared images. A threshold may be applied to the level of matching, such that levels of matching above a certain threshold provide an indication that the compared images are nearly identical, and that levels of matching below the threshold provide an indication that the compared images are demonstrably different.

In yet another example, the processing unit 156 may be configured to execute keypoint decision tree computer vision algorithms, which relies on extracting points in the image which contain more information, similar to SIFT, and using a collection decision tree to classify the image. An example of keypoint decision tree computer vision algorithms is the features-from-accelerated-segment-test (FAST), the performance of which can be improved with machine learning, as described in "Machine Learning for High-Speed Corner Detection" by E. Rosten and T. Drummond, Cambridge University, 2006.

As should be understood, results of such image comparison techniques may not be perfectly accurate, resulting in false detections and/or missed detections, due to artifacts such as noise in the captured images, and due to computational complexity. However, the selected image comparison technique may be configured to operate within a certain tolerance value to reduce the number of false detections and missed detections.

Although not show in the drawings, the processing unit 156 may be linked to a display in order to visually display the projectile strikes on the target area 125 for each individual shooter (or cumulatively for all shooters). Alternatively, or in addition, the processing unit 156 may be linked with a centralized server 162 via a network 164 to allow each shooter to access, via a computing device (e.g., smartphone, tablet, personal computer, laptop, etc.) linked to the network 164, personalized shooting accuracy performance. The network 164 may be formed of one or more wired or wireless networks, including, for example, the Internet, cellular networks, wide area, public, and local networks. Although not shown in the drawings, a communications module, including a network interface, may be coupled to the processing unit 156 to provide a communication link between the processing unit 156 and the network 164.

The server 162 may be implemented as a remote server, such as, for example, a cloud server or server system. The server includes a computerized processor, such as, for example, a microprocessor, which may be configured to perform some or all of the image processing functionality previously described as attributed to the processing unit 156. As such, in certain embodiments, all of the image processing functionality may be offloaded to the server 162. In other embodiments, the image processing functionality may be shared between the processing unit 156 and the server 162.

Figure 4:
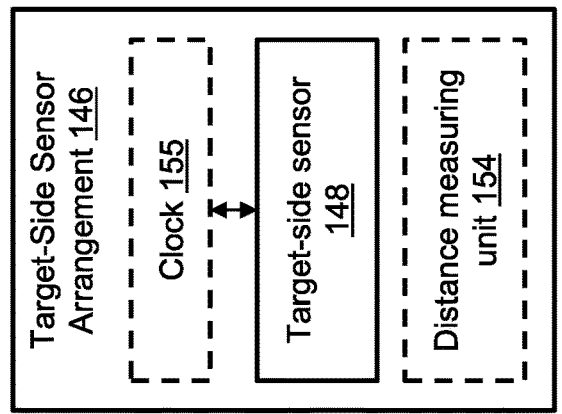
FIG. 4 is a block diagram of the target-side sensor arrangement, according to embodiments of the present disclosure.
Figure 3:
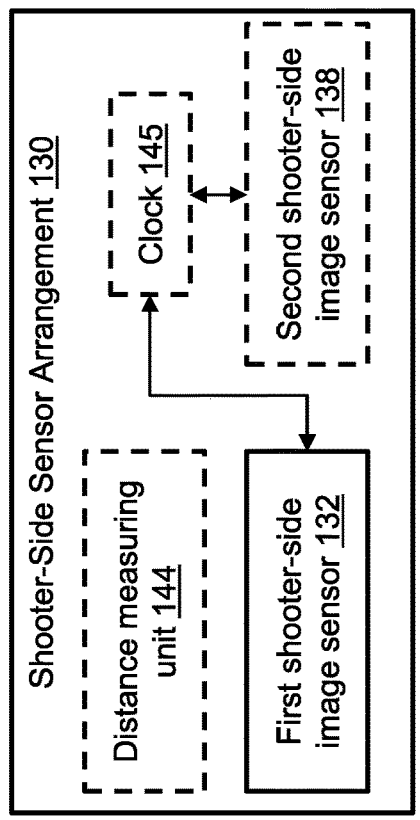
FIG. 3 is a block diagram of the shooter-side sensor arrangement, according to embodiments of the present disclosure.

In order to properly assign the accuracy scores or metrics to the individual shooters, the processing unit 156 first correlates the projectile discharges (which are linked to individual shooters) with projectile strikes. Before explaining the correlation process, attention is first directed to FIGS. 3 and 4, which illustrate block diagrams of the shooter-side sensor arrangement 130 and the target-side sensor arrangement 146, respectively, according to an embodiment of the present disclosure.

The shooter-side sensor arrangement 130 includes the first shooter-side image sensor 132 (and optionally the second shooter-side image sensor 138), and in certain embodiments includes a clock 145 and/or a distance measuring unit 144. The target-side sensor arrangement 146 includes the target-side projectile strikes detection sensor 148, and in certain embodiments includes a clock 155 and/or a distance measuring unit 154. The clocks 145 and 155 include timing circuitry which may be utilized to aid in synchronization between shooter-side sensor arrangement 130 and the processing unit 156. The clocks 145 and 155 may also provide temporal information (e.g., timestamp information), to the processing unit 156, for each of the images captured by the image sensors 132, 138, 148. In other embodiments, the processing unit 156 may apply timestamps to the data received from the sensor arrangements 130 and 146, thereby providing temporal information for the detection events (i.e., the projectile discharge events and the projectile strike events).

In embodiments in which the shooter-side sensor arrangement 130 includes a distance measuring unit 144, the distance measuring unit 144 is configured to measure (i.e., estimate) the distance between the shooter-side sensor arrangement 130 and each of the shooters 102, 110, 120. The distance measuring unit 144 may be implemented, for example, as a laser rangefinder that emits laser pulses for reflection off of a target (i.e., the shooters) and calculates distance based on the time difference between the pulse emission and receipt of the reflected pulse.

In certain embodiments, the distance measuring unit 144 may be absent from the shooter-side sensor arrangement 130, and the distance between the shooter-side sensor arrangement 130 and each of the shooters 102, 110, 120 may be calculated using principles of triangulation (i.e., stereoscopic imaging) based on images captured by two shooter-side image sensors (e.g., the first and second shooter-side image sensors 132 and 138) that are synchronized with each other. Alternatively, a single shooter-side image sensor, implemented as part of a stereo vision camera system, such as the Karmin2 stereo vision camera available from SODA VISION, may be used to measure the distance between the shooter-side sensor arrangement 130 and each of the shooters 102, 110, 120.

In embodiments in which the target-side sensor arrangement 146 includes a distance measuring unit 154, the distance measuring unit 154 is configured to measure the distance between the target-side sensor arrangement 146 and the target area 125. The distance measuring unit 154 may be implemented, for example, as a laser rangefinder. In certain embodiments, the distance measuring unit 154 may be absent from the target-side sensor arrangement 146, and the distance between the target-side sensor arrangement 146 and the target area 125 may be calculated (i.e., estimated) by applying image processing techniques, performed by the processing unit 156, to images of a visual marker attached to the target area 125. The visual marker may be implemented, for example, as a visual mark of a predefined size. The number of pixels dedicated to the portion of the captured image that includes the visual mark can be used as an indication of the distance between the target-side sensor arrangement 146 and the target area 125. For example, if the target-side sensor arrangement 146 is positioned relatively close to the visual mark, a relatively large number of pixels will be dedicated to the bar code portion of the captured image. Similarly, if the target-side sensor arrangement 146 is positioned relatively far from the visual mark, a relatively small number of pixels will be dedicated to the bar code portion of the captured image. As a result, a mapping between the pixel density of portions of the captured image and the distance to the object being imaged can be generated by the processing unit 156, based on the visual mark size.

Note that the system 100 may determine the aforementioned respective distances between the sensor arrangements 130 and 146 and the shooters and the target area in various ways. As discussed above, in certain embodiments, the distance is determined (i.e., estimated) via the distance measuring units 144 and 154. In other embodiments, an operator of the system 100, which may be, for example, a manager of the shooting range in which the system 100 is deployed, or one or more of the shooters 102, 110, 118, may manually input the aforementioned distances to the processing unit 156. In such embodiments, manual input to the processing unit 156 may be effectuated via user interface (e.g., a graphical user interface) executed by a computer processor on a computer system linked to the processing unit 156. In such embodiments, the processing unit 156 may be deployed as part of the computer system that executes the user interface.

In certain embodiments, the sensor arrangements 130 and 146 are approximately collocated. The two distances (i.e., between the shooter-side sensor arrangement 130 and the shooters, and between the target-side sensor arrangement 146 and the target area 125) are summed by the processing unit 156 to calculate (i.e., estimate) the distance between the target area 125 and shooters 102, 110, 118. As mentioned above, the typical distance between the shooter-side sensor arrangement 130 and the shooters 102, 110, 118 is preferably in the range of 6-8.5 meters, and the distance between the target-side sensor arrangement 146 and the target area 125 is preferably in the range of 0.8-1.5 meters. Accordingly, in a non-limiting deployment of the system 100, the distance between the shooters 102, 110, 118 and the target area 125 is in the range of 6.8-10 meters.

In other embodiments, the sensor arrangements 130 and 146 are spaced apart from each other at a pre-defined distance. Spacing the sensor arrangements 130 and 146 apart at a pre-defined distance may support long-range shooting capabilities, in which the distance between the shooters 102, 110, 118 and the target area 125 may be greater than 10 meters (for example several tens of meters and up two several hundred meters). In such an embodiment, the distance between the shooter-side sensor arrangement 130 and the shooters, between the target-side sensor arrangement 146 and the target area 125, and the pre-defined distance between the sensor arrangements 130 and 146 are summed by the processing unit 156 to calculate the distance between the target area 125 and shooters 102, 110, 118.

Based on the calculated distance between the target area 125 and shooters 102, 110, 118, and the average speed of a discharged projectile, the processing unit 156 determines an expected time of flight (ToF), defined as the time a discharged projectile will take to strike the target area 125, for each firearm. The processing unit 156 may store the expected ToFs for each firearm in a memory (e.g., the storage medium 160) or in a database as a data record with header or file information indicating to which firearm (i.e., shooter) each expected ToF corresponds.

It is noted that the range between the object (e.g., shooters or target) to be imaged and the sensor arrangements 130 and 146 may be increased in various ways. For example, higher resolution image sensors, or image sensors with larger optics (e.g., lenses) and decreased FOV, may be used to increase the range. Alternatively, multiple shooter-side image sensors with non-overlapping FOVs may be deployed to increase the operational range between the shooters and the shooter-side sensor arrangement 130.

In operation, for each detected projectile strike, the processing unit 156 evaluates the temporal information (i.e., timestamp) associated with the projectile strike. The processing unit 156 also evaluates the temporal information associated with recently detected projectile discharges. The processing unit 156 then compares the temporal information associated with the projectile strike with the temporal information associated with recently detected projectile discharges. The comparison may be performed, for example, by taking the pairwise differences between the temporal information associated with recently detected projectile discharges and the temporal information associated with the projectile strike to form estimated ToFs. The estimated ToFs are then compared with the expected ToFs to identify a closest match between estimated ToFs and expected ToFs. The comparison may be performed by taking the pairwise differences between the estimated ToFs and the expected ToFs, and then identifying the estimated ToF and expected ToF pair that yields the minimum (i.e., smallest) difference.

Since the processing unit 156 provides synchronization between the events detected in response to the data received from the sensor arrangements 130 and 146, which in certain embodiments is provided via synchronization of the clocks 145, 155, 161, the processing unit 156 is able to perform the ToF calculations with relatively high accuracy, preferably to within several micro seconds. Furthermore, by identifying the estimated ToF and expected ToF pair, the processing unit 156 is able to retrieve the stored information indicative of to which firearm (i.e., shooter) is associated with the expected ToF, thereby attributing the detected projectile strike to the shooter operating the firearm associated with the expected ToF of the identified estimated ToF and expected ToF pair. As such, the processing unit 156 is able to identify, for each detected projectile strike on the target area 125, the correspondingly fired firearm that caused the detected projectile strike.

The processing unit 156 may also be configured to provide target miss information for projectile discharges that failed to hit the target 126 or the target area 125. To do so, the processing unit 156 may evaluate temporal information associated with each detected projectile discharge. The processing unit 156 also evaluates the temporal information associated with recently detected projectile strikes. The processing unit 156 then compares the temporal information associated with the projectile discharge with the temporal information associated with recently detected projectile strikes. The comparison may be performed, for example, by taking the differences between the temporal information, similar to as described above, to form estimated ToFs. Pairwise differences between the estimated ToFs and the expected ToFs may then be performed. The estimated ToF and expected ToF pair that yields the minimum difference but is greater than a threshold value is attributed to the firearm (i.e., shooter) associated with the expected ToF as a target miss.

Figure 6:
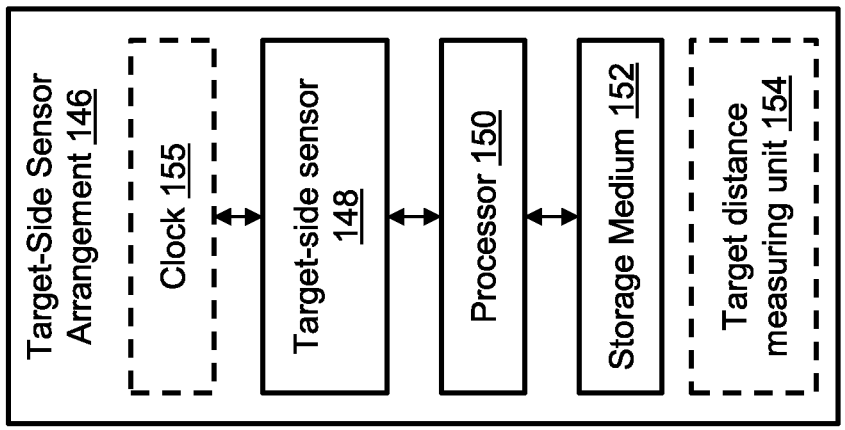
FIG. 6 is a block diagram of the target-side sensor arrangement, according to other embodiments of the present disclosure.
Figure 5:
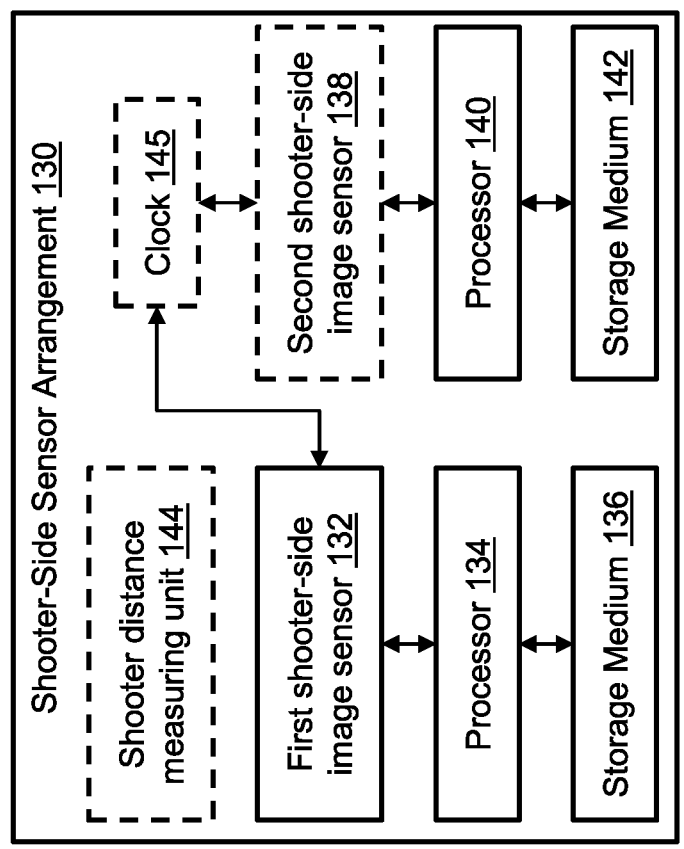
FIG. 5 is a block diagram of the shooter-side sensor arrangement, according to other embodiments of the present disclosure.

Although embodiments of the system 100 as described thus far have pertained to a processing unit 156 (and/or a server 162) performing image processing techniques to detect projectile discharges and projectile strikes, other embodiments are possible in which one or both of the sensor arrangements 130 and 146 include one or more processors having image processing capabilities. FIGS. 5 and 6 illustrate block diagrams of the shooter-side sensor arrangement 130 and the target-side sensor arrangement 146, respectively, according to such an embodiment.

As shown in FIG. 5, the shooter-side sensor arrangement 130 includes a processor 134 coupled to the first shooter-side image sensor 132 and a storage medium 136, and a processor 140 coupled to the second shooter-side image sensor 138 and a storage medium 142.

As shown in FIG. 6, the target-side sensor arrangement 146 includes a processor 150 coupled to the target-side projectile strikes detection sensor 148 and a storage medium 152.

Each of the processors 134, 140, 150 is generally similar to the processor 158, and should be understood by analogy thereto. Likewise, each of the storage mediums 136, 142, 152 is generally similar to the storage medium 160, and should be understood by analogy thereto.

In the embodiment of the system 100 described with reference to FIGS. 5 and 6, the shooter-side sensor arrangement 130 is configured to perform image processing techniques (via the processors 134 and 140) to detect projectile discharges, and the target-side sensor arrangement 146 is configured to perform image processing techniques (via the processor 150) to detect projectile strikes. In such an embodiment, the projectile discharge and projectile strike information may be sent, by the shooter-side sensor arrangement 130 and the target-side sensor arrangement 146, respectively, to the processing unit 156. The processing unit 156 may then perform the correlations, as described above, to identify, for each detected projectile strike on the target area 125, the correspondingly fired firearm that caused the detected projectile strike, and to identify target misses.

Figure 7:
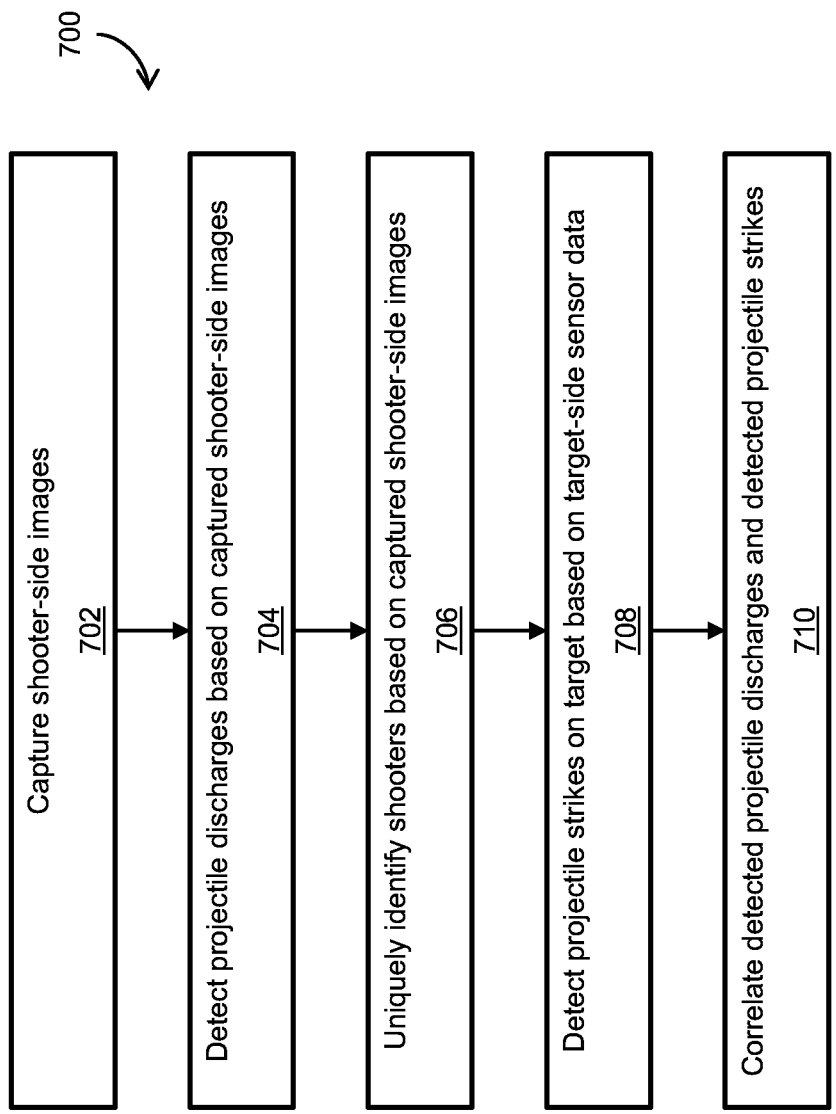
FIG. 7 is a flow diagram illustrating a process for joint firearm training of shooters, according to embodiments of the present disclosure.

Attention is now directed to FIG. 7 which shows a flow diagram detailing a process 700 in accordance with embodiments of the present disclosure. The process 700 includes steps for jointly training a plurality of shooters operating respective firearms. Reference is also made to some of the elements shown in FIGS. 1-6. The process 700 includes computerized sub-processes performed by the system 100 and related components, such as the processing unit 156, and in certain embodiments the processors 158 and/or 134 and/or 140 and/or 150 and/or the server 162.

The process 700 begins at block 702, where the shooter-side image sensor 132 (or sensors 132 and 138) capture series of images of the shooters and the target area, respectively.

The process 700 then moves to block 704, where projectile discharges are detected based on image data in the series of images captured by the shooter-side image sensor 132 (or sensors 132 and 138).

The process then moves to block 706, where the shooters that fired the respective firearms that triggered the respective detected projectile discharges are uniquely identified. Note that blocks 704 and 706 may be performed in parallel or in reverse order than the order shown in FIG. 7.

The process 700 then moves to block 708, where projectile strikes on the target area 125 are detected based on data collected by the target-side projectile strikes detection sensor 148.

As discussed above, in certain embodiments, the detection of the projectile discharges (in block 704) and the unique identification of shooters (in block 706) may be performed by the processing unit 156.

In other embodiments, the detection of the projectile discharges (in block 704) and/or the unique identification of shooters (in block 706) may be performed by a processor 134 of the shooter-side sensor arrangement 130 that is coupled to the shooter-side image sensor 132 (or processors 134 and 140 respectively coupled to the shooter-side image sensors 132 and 138).

In yet other embodiments, the detection of the projectile discharges (in block 704) and the unique identification of shooters (in block 706) may be performed by the server 162 alone or in combination with the processing unit 156.

It is noted that the processing system that performs the aforementioned detections performs such detections contemporaneously and in real-time.

The process 700 then moves to block 710, where the detected projectile discharges and the detected projectile strikes are correlated to create a link between projectile discharges and projectile strikes. Specifically, the correlation performed in block 710 provides identification, for each detected projectile strike on the target area 125, of the correspondingly fired firearm (and shooter that fired the firearm) that caused the detected projectile strike. The correlation performed in block 710 further provides identification of projectile discharges that fail to correspond to any projectile strike, thereby classifying such projectile discharges as misses.

Figure 8:
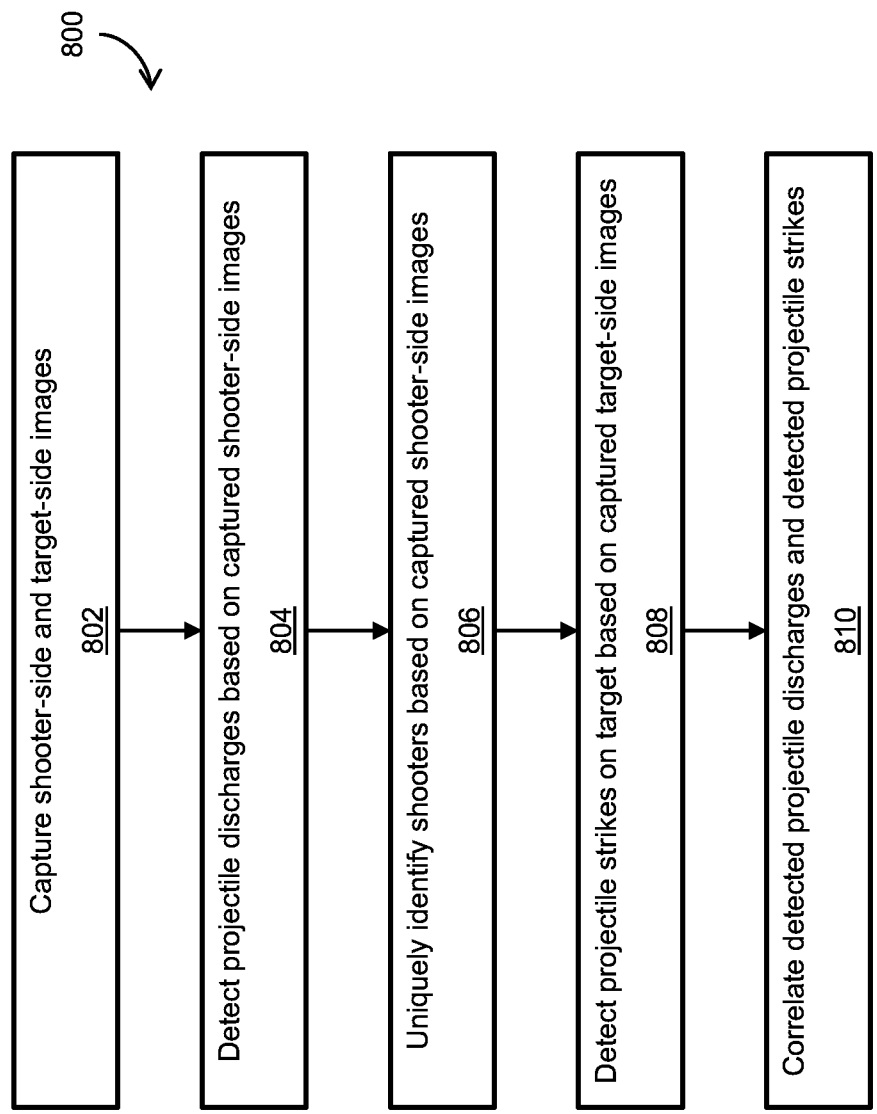
FIG. 8 is a flow diagram illustrating a process for joint firearm training of shooters in which the target-side sensor arrangement includes a target-side image sensor, according to embodiments of the present disclosure.

Attention is now directed to FIG. 8 which shows a flow diagram detailing a process 800 in accordance with embodiments of the present disclosure. The process 800 includes steps for jointly training a plurality of shooters operating respective firearms when the target-side sensor 148 is implemented as an image sensor.

Reference is also made to some of the elements shown in FIGS. 1-6. The process 800 includes computerized sub-processes performed by the system 100 and related components, such as the processing unit 156, and in certain embodiments the processors 158 and/or 134 and/or 140 and/or 150 and/or the server 162.

The process 800 begins at block 802, where the shooter-side image sensor 132 (or sensors 132 and 138) and the target-side projectile strikes detection sensor 148 capture series of images of the shooters and the target area, respectively.

The process 800 then moves to block 804, where projectile discharges are detected based on image data in the series of images captured by the shooter-side image sensor 132 (or sensors 132 and 138).

The process then moves to block 806, where the shooters that fired the respective firearms that triggered the respective detected projectile discharges are uniquely identified. Note that blocks 804 and 806 may be performed in parallel or in reverse order than the order shown in FIG. 8.

The process 800 then moves to block 808, where projectile strikes on the target area 125 are detected based on image data in the series of images captured by the target-side image sensor 148.

As discussed above, in certain embodiments, the detection of the projectile discharges (in block 804), the unique identification of shooters (in block 806), and the detection of the projectile strikes (in block 806) may be performed by the processing unit 156.

In other embodiments, the detection of the projectile discharges (in block 804) and/or the unique identification of shooters (in block 806) may be performed by a processor 134 of the shooter-side sensor arrangement 130 that is coupled to the shooter-side image sensor 132 (or processors 134 and 140 respectively coupled to the shooter-side image sensors 132 and 138). In such embodiments, the detection of the projectile strikes (in block 806) may be performed by a processor 150 of the target-side sensor arrangement 146 that is coupled to the target-side image sensor 148. The two processors 134 and 150 may be synchronized via the clocks 145 and 155.

In yet other embodiments, the detection of the projectile discharges (in block 804), the unique identification of shooters (in block 706), and the detection of the projectile strikes (in block 806) may be performed by the server 162 alone or in combination with the processing unit 156.

It is noted that the processing system that performs the aforementioned detections performs such detections contemporaneously and in real-time.

The process 800 then moves to block 810, wherein the detected projectile discharges and the detected projectile strikes are correlated to link projectile discharges with projectile strikes. Specifically, the correlation performed in block 810 provides identification, for each detected projectile strike on the target area 125, of the correspondingly fired firearm that caused the detected projectile strike. The correlation performed in block 708 further provides identification of projectile discharges that fail to correspond to any projectile strike, thereby classifying such projectile discharges as misses.

As a result of the correlation performed in block 708 of the process 700 and block 810 of the process 800, the system 100, and more specifically the processing unit 156 and/or the server 162 may provide shooter specific performance data and statistical data, for each individual shooter. The performance data may include, but is not limited to, the total number of projectiles fired, the average rate between projectile discharges, the projectile strikes cluster on the target 126, the average hit point (the average point in the height and width coordinates of a group of projectile strikes) and the average range of the shooter from the target area 125. The statistical data may include, but is not limited to, strike/miss and accuracy data (e.g., based on the accuracy scores or metrics). The strike/miss data may include data indicating the percentage of fired projectiles that struck the target 126, and data indicating the percentage of fired projectiles that missed the target 126 or the target area 125. The accuracy data may include average accuracy and the average strike position on the target 126.

As mentioned in previous sections of the present disclosure, the processing unit 156 may link each identified projectile discharge with the firearm that discharged the projectile by identifying each of the firearms and/or shooters via various identification methods. The identification of shooters and/or firearms, by components of the system 100, may be performed using various machine learning and/or computer vision algorithms and techniques. In certain embodiments, one or more visual parameters associated with each of the shooters and/or firearms are evaluated. The following paragraphs describe several exemplary methods for identifying firearms and/or shooters, according to embodiments of the present disclosure.

In certain embodiments, the processing unit 156 is configured to analyze the images captured by the shooter-side image sensor 132 (or image sensors 132 and 138) using facial recognition techniques to identify individual shooters. In such embodiments, each of the shooters may provide a baseline facial image (e.g., digital image captured by a camera system) to the system 100, which may be stored in a memory of the system 100, for example the storage medium 160. The processing unit 156 may extract landmark facial features (e.g., nose, eyes, cheekbones, lips, etc.) from the baseline facial image. The processing unit 156 may then analyze the shape, position and size of the extracted facial features. In operation, the processing unit 156 identifies facial features in the images captured by the shooter-side image sensor 132 (or image sensors 132 and 138) by searching through the captured images for images with matching features to those extracted from the baseline image.

In another embodiment, computer vision techniques are used to identify shooters based on markers attached to the bodies of the shooters or the firearms operated by the shooters. As shown in FIG. 1, a first marker 108 is attached to a headpiece worn by the first shooter 102, a second marker 116 is attached to a headpiece worn by the second shooter 110, and a third marker 124 is attached to a headpiece worn by the third shooter 118.

In a non-limiting implementation, the markers 108, 116, 124 are color-coded markers, with each shooter/firearm having a uniquely decipherable color. In the non-limiting example deployment of the system 100 illustrated in FIG. 1 with three shooters, the first shooter 102 may have a red marker attached to his body or firearm 104, the second shooter 110 may have a green marker attached to his body or firearm 112, and the third shooter 118 may have a blue marker attached to his body or firearm 120. The marker colors may be provided to the processing unit 156 prior to operation of the system 100. In operation, the processing unit 156 identifies the color-coded markers in the images captured by the shooter-side image sensor 132 (or image sensors 132 and 138) which enables identification of the individual shooters and/or firearms.

In another non-limiting implementation, the marker may be implemented as an information-bearing object, such as, for example, a bar code, that carries identification data. The bar code may store encoded information that includes the name and other identifiable characteristics of the shooter to which the bar code is attached. In operation, the processing unit 156 searches for bar codes in the images captured by the shooter-side image sensor 132 (or image sensors 132 and 138), and upon finding such a bar code, decodes the information stored in the bar code, thereby identifying the shooter (or firearm) to which the bar code is attached.

In another embodiment, the processing unit 156 may be configured to identify individual shooters according to geographic position of each shooter within the FOV of the shooter-side image sensor 132 (or image sensors 132 and 138. In such embodiments, the FOV of the shooter-side image sensor 132 (or image sensors 132 and 138 may be sub-divided into non-overlapping sub-regions (i.e., sub-coverage areas), with each shooter positioned in a different sub-region.

Figure 9B:
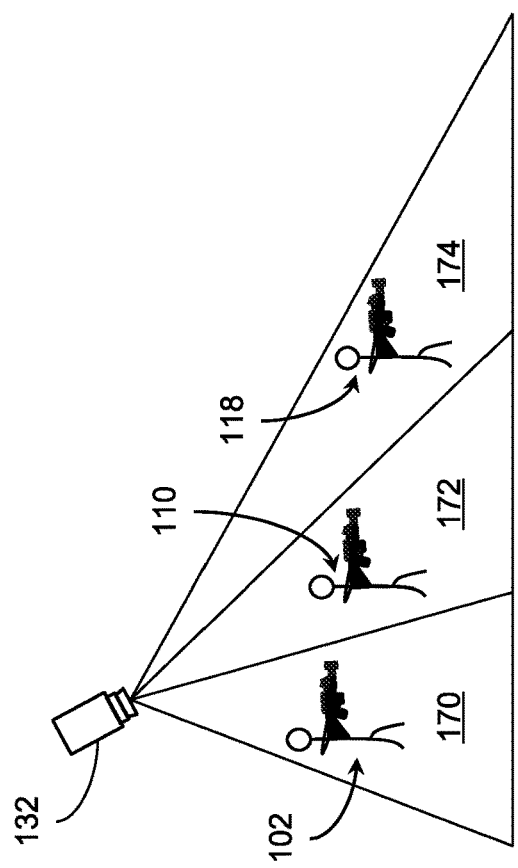
FIG. 9B is a schematic representation of the FOV of FIG. 9A being sub-divided into multiple regions, with a different shooter positioned in each region, according to embodiments of the present disclosure.
Figure 9A:
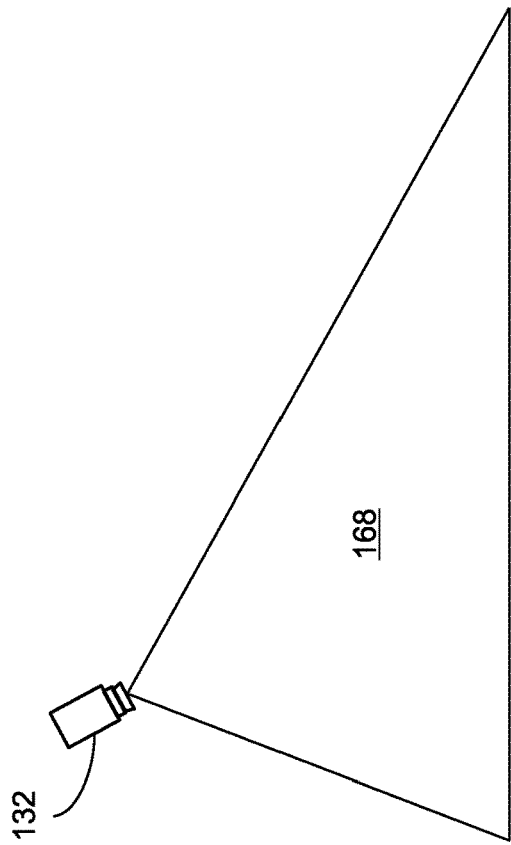
FIG. 9A is a schematic representation of a field-of-view (FOV) associated with a shooter-side image sensor of the shooter-side sensor arrangement, according to embodiments of the present disclosure.

FIG. 9A shows a schematic representation of the FOV 168 of the first shooter-side image sensor 132. FIG. 9B shows a schematic representation of the sub-division of the FOV 168 into three sub-regions, namely a first sub-region 170, a second sub-region 172, and a third sub-region 174. The first shooter 102 is positioned in the first sub-region 170, the second shooter 110 is positioned in the second sub-region 172, and the third shooter 118 is positioned in the third sub-region 174. The sub-division of the FOV 168 may be pre-determined (i.e., prior to operation of the system 100 to perform the joint training disclosed herein). Likewise, the requisite position of each of the shooters, in the respective sub-regions of the FOV may be pre-assigned and provided to the processing unit 156. In operation, the processing unit 156 analyzes the images captured by the shooter-side image sensor 132 to identify the shooters according to the pre-defined position in the FOV sub-regions 170, 172, 174.

Although embodiments of the system 100 as described thus far have pertained to detecting projectile discharges and projectile strikes, and correlating the detected discharges and strikes to link the discharges with strikes, embodiments of the present disclosure may also be used to advantage when applied to collaborative and interactive virtual training scenarios which simulate real-life combat or combat-type situations and/or firearms training and/or competitions, such as in a virtual firing range.

Figure 10:
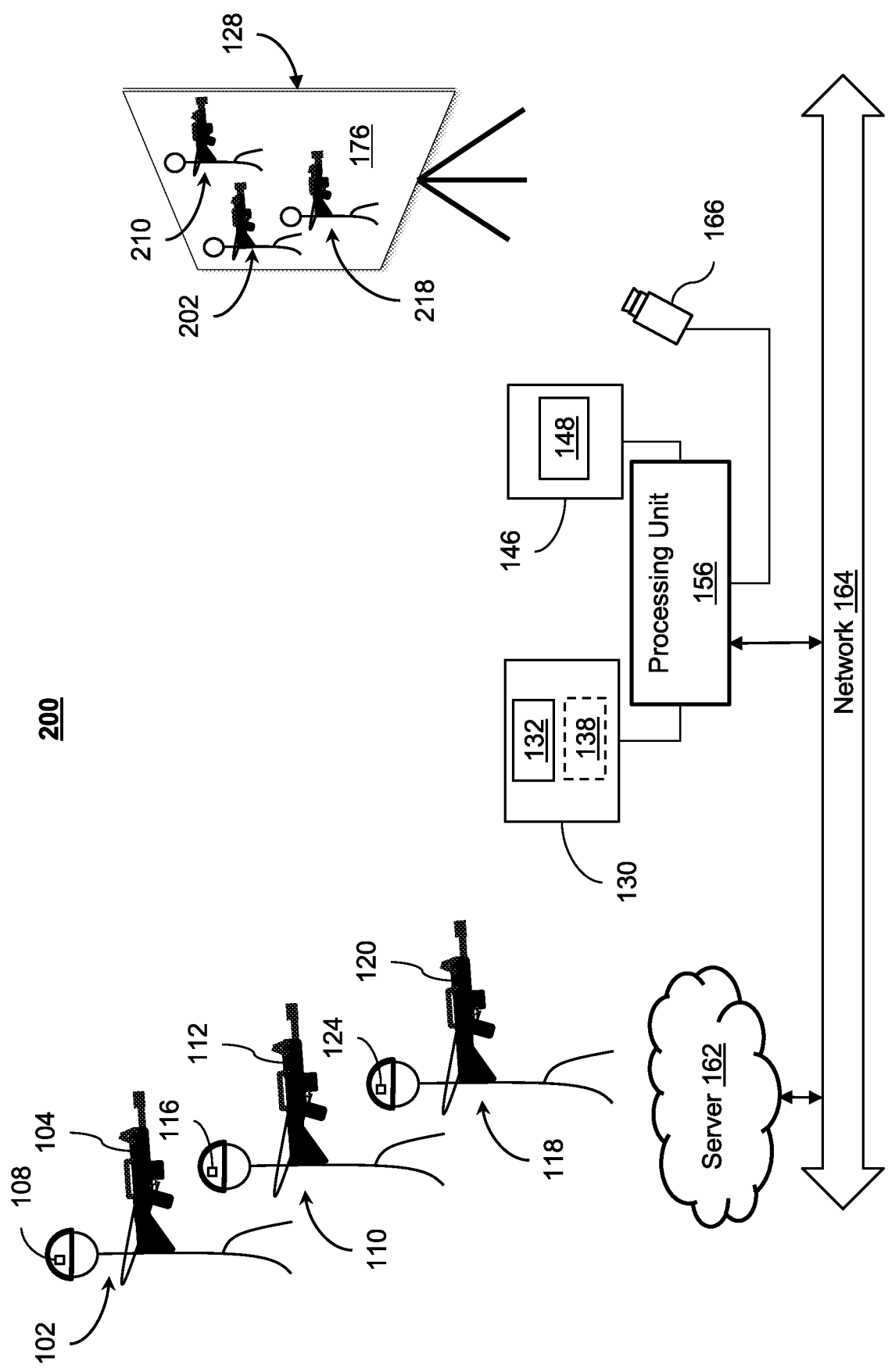
FIG. 10 is a schematic illustration of a system, similar to the system of FIG. 1, that includes an image projecting unit that projects virtual shooter entities onto a background, according to embodiments of the present disclosure.

Referring now to FIG. 10, there is shown a system, generally designated 200, for performing joint (i.e., collaborative) firearm training of shooters, according to an embodiment of the present disclosure. The system 200 is generally similar to the system 100, except that the system 200 includes an image projecting unit 166 linked to the processing unit 156. The image projecting unit 166 is configured for projecting images of a virtual training environment 176 on the background 128. In such embodiments, the background 128 may be implemented as a projection screen. The image projecting unit 166 may be implemented in various ways, including, for example, as a micro short throw projector, such as the LG PF1000UW Portable Ultra Short Throw Projector or Sony LSPX-P1 Portable Ultra Short Throw Projector.

As an example of such a virtual training environment, the image projecting unit 166 may project a video or animated image of an armed hostage taker holding a hostage. In such a scenario, the hostage taker is treated by the system 200 as the target 126. As such, the position of the target 126 may change dynamically as the image of the hostage taker moves during progression of the training environment.

In response to a detected projectile strike or miss on the defined target (e.g., the hostage taker or other target object projected by the image projecting unit 166), the processing unit 156 may actuate the image projecting unit 166 to change the projected image. For example, if the image projecting unit 166 projects an image of a hostage taker holding a hostage, and one of the shooters discharges a projectile that misses the target (i.e., the hostage taker), the processing unit 156 may actuate the image projecting unit 166 to change the projected image to display the hostage taker attacking the hostage.

As should be apparent, the above description of the hostage scenario is exemplary only, and is intended to help illustrate the functionality of the system 200. In addition to the above, the image projecting unit 166 is configured to project images of virtual entities 202, 210, 218 corresponding to the respective shooters 102, 110, 118. The virtual entities may be avatars of the respective shooters, or may be images of the actual shooters. In such embodiments, the shooter-side image sensor 132 and the processing unit 156 cooperate to perform motion-capture functionality, such that actions performed by the shooters 102, 110, 118 in the real-world (e.g., firing of firearms, arm movement, head movement, pivoting, walking, etc.) are translated into virtual actions performed by the corresponding virtual entities 202, 210, 218 in the virtual training environment 176. The processing unit 156 is also configured to translate detected projectile discharges in the real-world into virtual projectile discharges in the virtual training environment 176. Furthermore, the processing unit 156 is configured to translate detected projectile strikes in the real-world into virtual projectile strikes in the virtual training environment 176.

As discussed above, the processing unit 156 of the presently disclosed embodiments may be linked to a server 162 via a network 164. In addition to providing capabilities for allowing the shooters to access personalized performance data and statistical data, and for offloading some or all of the image processing functionality from the processing unit 156, the server 162 may also provide connectivity between multiple shooters operating in different geographic locations.

Figure 11:
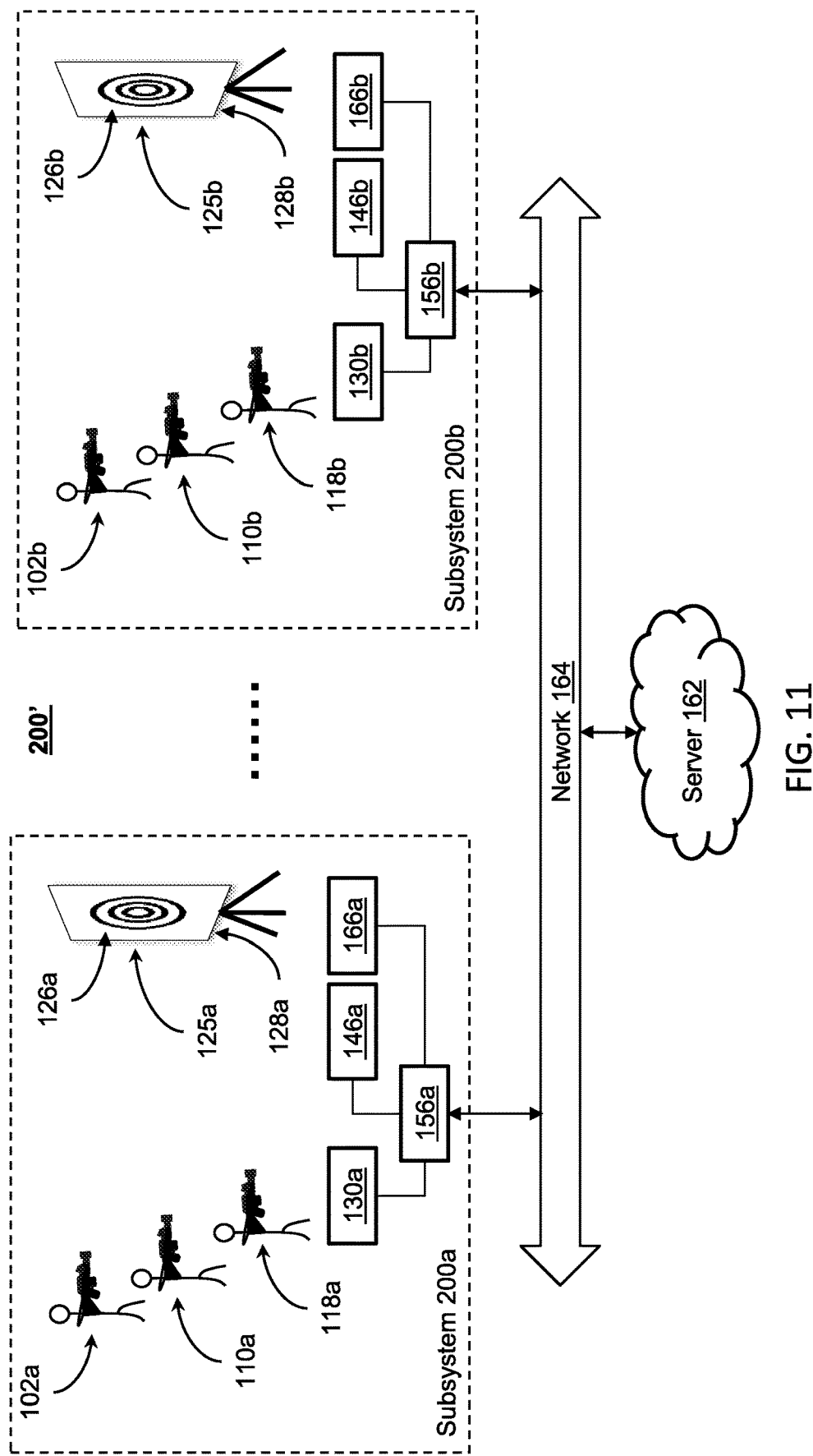
FIG. 11 is a schematic illustration of a system, operative according to embodiments of the present disclosure, operating over a network.

FIG. 11 shows a networked system, generally designated 200', in which multiple subsystems are deployed and interconnected with the server 162 via the network 164. The system 200' includes at least one subsystem generally similar to the system 200 of FIG. 10. As shown in FIG. 11, the system 200' depicts a first subsystem, generally designated 200a, and second subsystem, generally designated 200b. Each of the subsystems 200a and 200b are generally similar to the system 200. In general terms, the system 200' can include up to N subsystems, in which N can take on any positive integer value. In implementations in which N=1, the system 200' is equivalent to the system 200 illustrated in FIG. 10.

The subsystems 200a and 200b are deployed in different respective geographic locations. Specifically, the sensor arrangements 130a and 146a, the processing unit 156a, and the image projecting unit 166a are collocated in a first geographic location. Likewise, the sensor arrangements 130b and 146b, the processing unit 156b, and the image projecting unit 166b are collocated in a second geographic location that is different from the first geographic location.

The networked environment, that provides interconnection between the subsystems 200a and 200b and the server 162, provides a joint training platform in which multiple shooters, based in different geographic locations, can participate in a shared virtual training environment.

In the non-limiting example deployment of the system 200' illustrated in FIG. 10, a total of six shooters utilize the system 200', with a first subset of shooters (i.e., the shooters 102a, 110a, 118a) deployed to use the first subsystem 200a in the first geographic location, and a second subset of shooters (i.e., the shooters 102b, 110b, 118b) deployed to use the second subsystem 200b in the second geographic location.

In operation, the shooter-side image sensor of the shooter-side sensor arrangement 130a captures images of the first plurality of shooters 102a, 110a, 118a, and the shooter-side image sensor of the shooter-side sensor arrangement 130b captures images of the second plurality of shooters 102b, 110b, 118b. Similarly, the target-side sensor of the target-side sensor arrangement 146a detects projectile strikes on a target 126a that is projected as part of the shared virtual environment on the background 128a by the image projecting unit 166a. The target-side sensor of the target-side sensor arrangement 146b detects projectile strikes on a target 126b that is projected as part of the shared virtual environment on the background 128b by the image projecting unit 166b.

In addition to projecting the targets 126a and 126b, the image projecting units 166a and 166b are also configured to project the shared virtual environment on both backgrounds 128a and 128b. The shared virtual environment includes images of virtual entities corresponding to all of the shooters (i.e., the shooters 102a, 102b, 110a, 110b, 118a, 118b).

The processing units 156a and 156b are configured to perform local projectile discharge and projectile strike detection. In other words, the processing unit 156a is configured to analyze the images captured by the shooter-side image sensor of the shooter-side sensor arrangement 130a, and receive projectile strike detections from the target-side projectile strikes detection sensor of the target-side sensor arrangement 146a. In embodiments in which the target-side projectile strikes detection sensor of the target-side sensor arrangement 146a is implemented as an image sensor, the processing unit 156a is configured to analyze the images captured by the target-side projectile strikes detection sensor of the target-side sensor arrangement 146a to detect projectile strikes on the target 126a. Similarly, the processing unit 156b is configured to analyze the images captured by the shooter-side image sensor of the shooter-side sensor arrangement 130b, and receive projectile strike detections from the target-side projectile strikes detection sensor of the target-side sensor arrangement 146b. In embodiments in which the target-side projectile strikes detection sensor of the target-side sensor arrangement 146b is implemented as an image sensor, the processing unit 156b is configured to analyze the images captured by the target-side projectile strikes detection sensor of the target-side sensor arrangement 146b to detect projectile strikes on the target 126b.

The server 162 is configured to receive the detected projectile discharges and the detected projectile strikes from the processing units 156a and 156b, and is configured to co-process the received detected projectile discharges and the detected projectile strikes to translate the projectile discharges and the projectile strikes into shared virtual actions in the shared virtual environment. In certain embodiments, the server 162 may also co-process the aforementioned detected projectile discharges and the detected projectile strikes together with sensor data (e.g., image data in the form of captured images, acoustic sensor data, etc.) received from the shooter-side image sensors (of the shooter-side sensor arrangements 130a and 130b) and target-side sensors (of the target-side sensor arrangements 146a and 146b) to translate the projectile discharges and the projectile strikes into shared virtual actions in the shared virtual environment.

It is noted that although the embodiments of the present disclosure described above have in many instances been provided within the context of three shooters firing on a single target or three dedicated targets, such context was provided in order to better describe and illustrate the embodiments of the present disclosure. The embodiments of the present disclosure should not be limited to a specific number of shooters and/or targets.

Implementation of the system and/or method of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. As discussed above, the data management application may be implemented as a plurality of software instructions or computer readable program code executed on one or more processors of a mobile communication device. As such, in an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The block diagrams in the drawings illustrate the architecture, functionality, and operation of possible implementations of systems, devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for jointly training a plurality of shooters, the system comprising:
    a shooter-side sensor arrangement including at least one shooter-side image sensor that captures images of the shooters and a plurality of respective firearms periodically fired by the shooters;
    a target-side sensor arrangement including at least one target-side sensor that collects data indicative of projectile strikes on a target area associated with at least one target; and
    a processing unit including at least one processor operatively coupled to the shooter-side sensor arrangement and the target-side sensor arrangement, wherein the sensor arrangements are synchronized by the processing unit, wherein at least one of the target-side sensor arrangement or the processing unit detects projectile strikes on the target area based on the data collected by the at least one target-side sensor, and wherein the processing unit is configured for:
        analyzing one or more of the images captured by the at least one shooter-side image sensor to detect projectile discharges in response to firing of the respective firearms,
        analyzing one or more of the images captured by the at least one shooter-side image sensor by evaluating one or more visual parameters associated with each of the shooters to uniquely identify each of the shooters associated with the detected projectile discharges, and
        correlating, based on the synchronization of the sensor arrangements, detections of projectile strikes and the detected projectile discharges to identify, for each detected projectile strike on the target area, a correspondingly fired firearm of the respective firearms associated with the uniquely identified shooter.

2. The system of claim 1, wherein the at least one target-side sensor is an image sensor, and wherein the processing unit is further configured for analyzing image data captured by the target-side image sensor to detect projectile strikes on the target area corresponding to firing of the respective firearms.

3. The system of claim 1, wherein the at least one shooter-side image sensor has an associated field of view, and wherein the associated field of view is divided into sub-regions, and wherein each shooter is positioned in a different sub-region.

4. The system of claim 1, wherein the detected projectile discharges and the detected projectile strikes include temporal information.

5. The system of claim 4, wherein the correlating includes analyzing the temporal information of the detected projectile discharges and the detected projectile strikes to form estimated of times of flight for pairs of detected projectile discharges and detected projectile strikes.

6. The system of claim 1, further comprising: an image projecting unit linked to the processing unit and operative to project a virtual scenario onto a background, and wherein the target area is included in the projected virtual scenario.

7. The system of claim 6, wherein each of the shooters has a corresponding virtual entity, projected onto the background by the image projecting unit, and wherein the processing unit is configured to translate real actions performed by the shooters into virtual actions performed by the corresponding virtual entities based on the images captured by the at least one shooter-side image sensor.

8. The system of claim 1, wherein the processing unit is linked to a server via a network.

9. The system of claim 1, wherein the at least one target includes a plurality of targets, and wherein each respective firearm is fired at a respective one of the plurality of targets.

10. The system of claim 1, wherein the plurality of shooters includes more than two shooters, wherein a first subset of shooters periodically fires a first subset of the respective firearms to strike a first target, and wherein a second subset of shooters periodically fires a second subset of the respective firearms to strike a second target, and wherein the first and second targets are deployed in different geographic locations.

11. The system of claim 1, further comprising a server, and wherein the shooter-side sensor arrangement includes a plurality of shooter-side sensor arrangements, and wherein the target-side sensor arrangement includes a plurality of target-side sensor arrangements, and wherein the processing unit includes a plurality of processing units being linked to the server via a wired or wireless network, and wherein the server is configured to:
receive data via the plurality of processing units, the received data including the detections of projectile strikes, the detected projectile discharges, and sensor data from the shooter-side sensor arrangements and the target-side sensor arrangements, and
process the received data to translate real actions associated with the shooters and projectile strikes into virtual actions in a shared virtual environment.

12. The system of claim 11, wherein a first one of the shooter-side sensor arrangements, a first one of the target-side sensor arrangements, and a first one of the processing units are deployed together in a first geographic location, and wherein a second one of the shooter-side sensor arrangements, a second one of the target-side sensor arrangements, and a second one of the processing units are deployed together in a second geographic location different from the first geographic location.

13. A method for jointly training a plurality of shooters, the method comprising:
analyzing, by a processing unit having at least one processor, one or more images, captured by at least one shooter-side image sensor, of the shooters and respective firearms periodically fired by the shooters to detect projectile discharges in response to firing of the respective firearms;
analyzing, by the processing unit, the one or more captured images of the shooters and the respective firearms periodically fired by the shooters by evaluating one or more visual parameters associated with each of the shooters to uniquely identify each of the shooters associated with the detected projectile discharges;
collecting, by at least one target-side sensor, data indicative of projectile strikes on a target area associated with at least one target; and
correlating, by the processing unit, the detected projectile discharges and the detected projectile strikes to identify, for each detected projectile strike on the target area, a correspondingly fired firearm of the respective firearms associated with the uniquely identified shooter,
wherein the at least one shooter-side image sensor and the at least one target-side sensor are synchronized by the processing unit, and wherein the correlating is performed based on the synchronization of the at least one shooter-side image sensor and the at least one target-side sensor.

14. The method of claim 13, wherein the detected projectile discharges and the detected projectile strikes include temporal information, and wherein the correlating includes analyzing the temporal information of the detected projectile discharges and the detected projectile strikes to form estimated of times of flight for pairs of detected projectile discharges and detected projectile strikes.

15. The system of claim 11, wherein the real actions associated with the shooters include at least one of movement of the shooters and firing of respective firearms.

16. A system for jointly training a plurality of shooters, the system comprising:
a shooter-side sensor arrangement including at least one shooter-side image sensor that captures images of the shooters and a plurality of respective firearms periodically fired by the shooters, wherein the at least one shooter-side image sensor has an associated field of view that is divided into sub-regions, and wherein each shooter of the plurality of shooters is positioned in a different respective sub-region;
a target-side sensor arrangement including at least one target-side sensor that collects data indicative of projectile strikes on a target area associated with at least one target; and
a processing unit including at least one processor operatively coupled to the shooter-side sensor arrangement and the target-side sensor arrangement, wherein the shooter-side sensor arrangement and the target-side sensor arrangement are synchronized by the processing unit, and wherein at least one of the target-side sensor arrangement or the processing unit detects projectile strikes on the target area based on the data collected by the at least one target-side sensor, and wherein the processing unit is configured for:

analyzing one or more of the images captured by the at least one shooter-side image sensor to detect projectile discharges in response to firing of the respective firearms, and to uniquely identify each of the shooters associated with the detected projectile discharges, and correlating, based on the synchronization of the sensor arrangements, detections of projectile strikes and the detected projectile discharges to identify, for each detected projectile strike on the target area, a correspondingly fired firearm of the respective firearms associated with the uniquely identified shooter.

17. A method for jointly training a plurality of shooters, the method comprising:

analyzing, by a processing unit having at least one processor, one or more images, captured by at least one shooter-side image sensor, of the shooters and respective firearms periodically fired by the shooters to detect projectile discharges in response to firing of the respective firearms, wherein the at least one shooter-side image sensor has an associated field of view that is divided into sub-regions, and wherein each shooter of the plurality of shooters is positioned in a different respective sub-region;

analyzing, by the processing unit, the one or more captured images of the shooters and the respective firearms periodically fired by the shooters to uniquely identify each of the shooters associated with the detected projectile discharges;

collecting, by at least one target-side sensor, data indicative of projectile strikes on a target area associated with at least one target; and correlating, by the processing unit, the detected projectile discharges and the detected projectile strikes to identify, for each detected projectile strike on the target area, a correspondingly fired firearm of the respective firearms associated with the uniquely identified shooter, wherein the at least one shooter-side image sensor and the at least one target-side sensor are synchronized by the processing unit, and wherein the correlating is performed based on the synchronization of the at least one shooter-side image sensor and the at least one target-side sensor.

* * * * *